Sept. 27, 1960     D. R. SAND     2,954,103
BRAKE MECHANISM

Filed Aug. 19, 1957     2 Sheets-Sheet 1

INVENTOR.
Darrel R. Sand
BY
W. C. Middleton
ATTORNEY

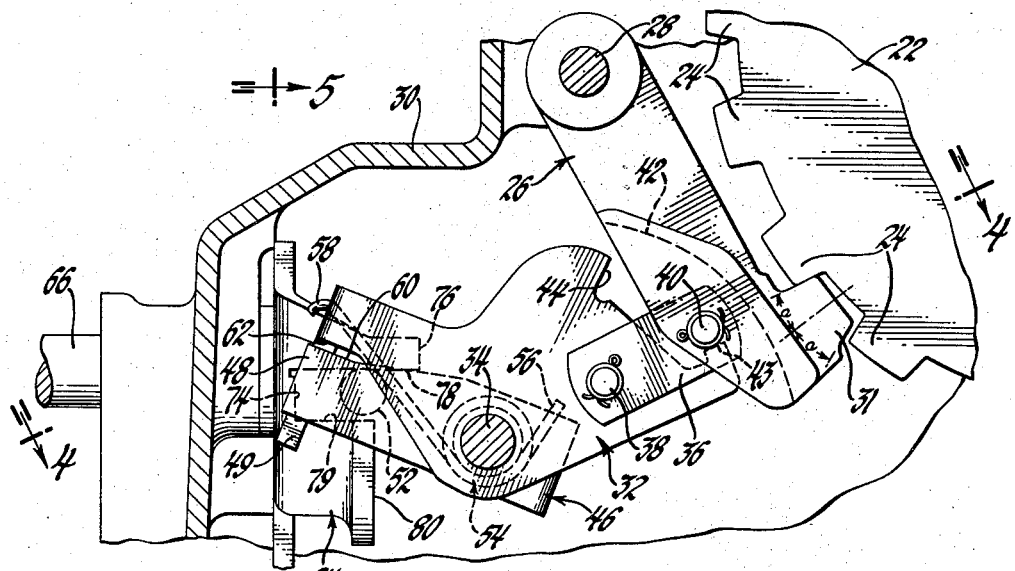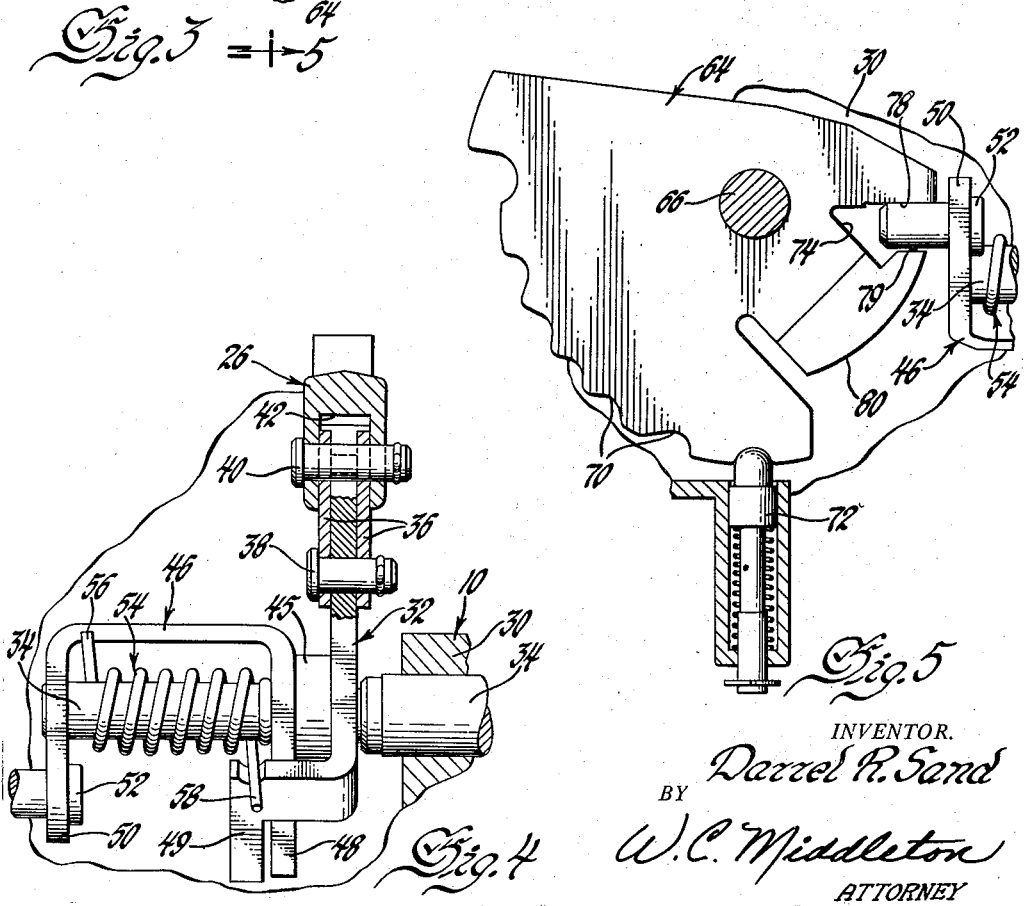

2,954,103

BRAKE MECHANISM

Darrel R. Sand, Plymouth, Mich., assignor to General Motors Corporation, Detroit, Mich., a corporation of Delaware Filed Aug. 19, 1957, Ser. No. 678,834

8 Claims. (Cl. 188—69)

This invention relates generally to brake mechanisms and particularly to improvements in parking brake mechanisms for motor vehicles.

In brake mechanisms of the positive type, it is essential that brake disengagement occur with minimum operator effort. To explain, assume the brake mechanism is engaged with the vehicle positioned on a relatively steep incline. Due to the inherent nature of a positive brake, the engaging surfaces thereof have force components acting thereon that resist any tendency of the vehicle to move down the incline. Unless provision is made for this situation, leverages afforded the operator may not be adequate and the brake, therefore, cannot be disengaged. Furthermore, due to manufacturing tolerances, the geometry of different brakes may vary sufficiently for one brake to be difficult to disengage while another brake will not effectively hold the vehicle against movement. As a consequence, the dimensional tolerances may be held close in order to compensate and prevent an occurrence of such extremes, increasing the overall cost of each brake.

Accordingly, the invention contemplates a brake mechanism that is both yieldably engageable and easily and positively disengageable at all times with minimum operator effort, and that is relatively uninfluenced by manufacturing tolerances.

In addition, the invention seeks to provide an optimum linkage for a brake mechanism of the foregoing character, the geometry of which is effectively controlled without requiring close manufacturing tolerances.

Specifically, the invention affords a brake mechanism in which critical dimensional relationships are confined in a novel manner so as to reduce fluctuations between different mechanisms due to manufacturing tolerances.

According to one form of the invention, a toothed locking gear is secured to a transmission shaft, in turn, drive connected to the vehicle wheels and coacts with a toothed pawl element mounted for pivotal movement to and from an engaged position relative to the locking gear. The tooth configurations of both the locking gear and the pawl element are, preferably, arranged to encourage disengagement under load. A transfer lever and a control lever are coaxially and rotatably mounted on a fixed stub shaft with a torsion spring interposed therebetween. This torsion spring urges drive surfaces on the transfer and control levers into engagement affording a yieldable connection therebetween in one direction and a positive connection in the opposite direction. A pair of links interconnect the control lever and the pawl element through pivotal pin connections at the opposite ends thereof.

When the pawl element is in the engaged position, the centers defined by the rotational axis of the control lever and the pivotal pin connections are substantially aligned and a control surface on the control lever engages the pin connecting the pawl and the links, hence preventing the control lever from being rotated to an overcenter position. In addition to the control surface a stop is provided on the control lever which limits the extent of movement of the pawl from the disengaged position. Since the control lever has the major control points thereon, the overcenter condition can be prevented conveniently without requiring close tolerances on the other components of the mechanism.

A sector plate is positionable in a plurality of transmission settings by a transmission selector lever and includes a Park or Brake position in which the sector plate engages the transfer lever and by the torsion spring rotates the control lever and accordingly, the pawl element to the engaged position. If the teeth on the locking gear and the tooth on the pawl element are not aligned, then, the yieldable connection furnished by this spring permits positioning of the selector lever in the Park position and upon subsequent movement of the vehicle, the pawl element due to the loading on the spring, will be biased into engagement with the locking gear. When the selector lever is moved out of the Park position, the sector plate rotates the transfer lever whereupon the coacting drive surfaces on the transfer and control levers engage to produce a positive pull out of the pawl element from the engaged position. The pull out is assisted by any load that may be applied to the locking gear such as that resulting from parking the vehicle on an incline.

The foregoing and other objects and advantages of the invention will be apparent from the following description and the accompanying drawings, in which:

Figure 3 is a view of the brake mechanism demonstrated in the engaged position;

Figure 4 is a fragmentary view along lines 4—4 of Figure 3; and

Figure 5 is a view looking in the direction of arrows 5—5 of Figure 3.

Figure 1:
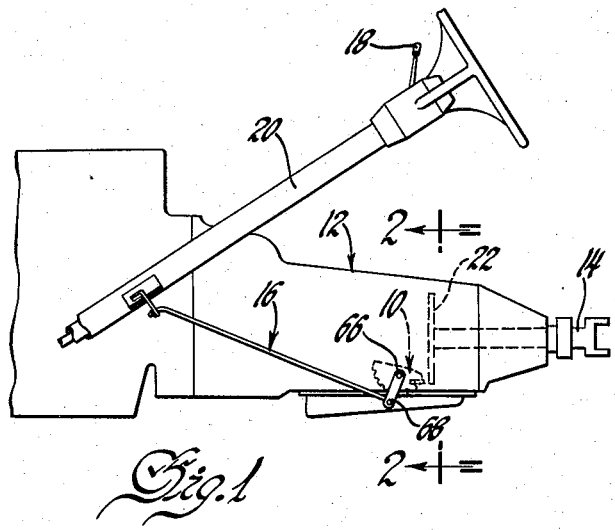
Figure 1 is a side view of a transmission embodying a brake mechanism constructed according to the invention.

In a preferred embodiment shown by Figure 1, a parking brake mechanism, indicated generally at 10, is combined with a transmission 12 to prevent rotation of a transmission output shaft 14 in either direction and, accordingly, the associated vehicle wheels (not shown). The parking brake mechanism 10 is operated through a suitable agency, as linkage 16, by a conventional transmission selector lever 18 of the character which is revolvably mounted on a steering column 20.

Figure 2:
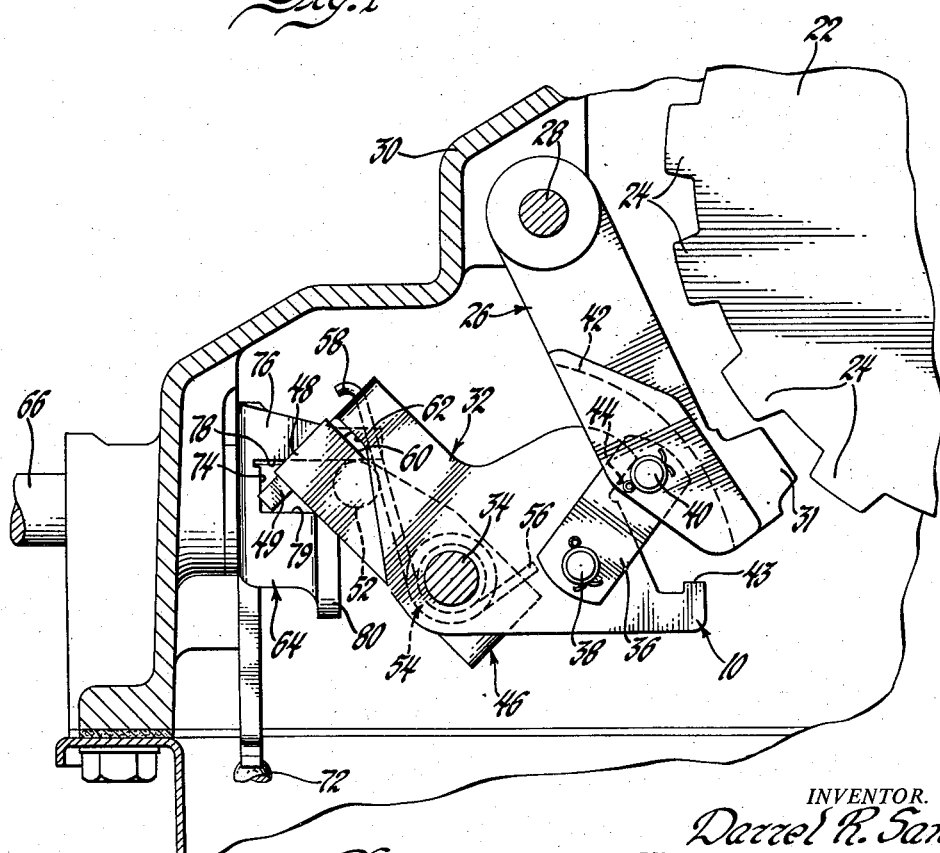
Figure 2 is a view of the brake mechanism depicted in the disengaged position, taken substantially on line 2—2 of Figure 1.

With reference to Figures 2 and 3, in particular, a locking member, such as toothed locking gear 22, is drive connected to the transmission output shaft 14 and comprises a series of peripherally spaced teeth 24. Opposite the locking gear 22, a locking element, e.g., toothed pawl element 26, is rotatably mounted on a stub shaft 28 supported by the transmission casing 30. A tooth 31 on a pawl element 26 is arranged to interengage with the teeth 24 on the locking gear 22 when aligned therewith. As best seen in Figure 3, the toothed side angles (*a*) are selected to effect a free and easy separation of the teeth when under load and, consequently, because the permissive range of angles is large are not critical. In other words, any force tending to rotate the locking gear 22 relative to the locking pawl element 26 will cause sliding movement along the tooth side surfaces and, hence, when desired, eject pawl tooth 31 from engagement with the teeth 24. This feature not only assists in furnishing an easy disengagement of the pawl element 26, but also eliminates the necessity of providing a spring or other medium for urging the pawl element 26 from the disengaged position.

The extent of movement of the pawl element 26 is determined by a control lever 32 rotatably mounted on a cross shaft 34 installed in the transmission casing 30. A pair of links 36 are positioned on opposite sides of the control lever 32 and by clevis pins 38 and 40, respectively, join the control lever 32 and the pawl element 26. The links 36 are located on the exterior sides of the lever 32 but are disposed within an arcuate recess 42 along the back side of the pawl element, as illustrated in Figure 4. With the pawl element 26 in the engaged position depicted in Figure 3, an accurately machined control surface 43 engages the side of the clevis pin 40 while in the disengaged position of the pawl element 26 an adjacent abutment surface 44, as shown in Figure 2, engages the opposite side of the pin 40. Consequently, the two extreme positions of the pawl element 26 are determined by the control lever 32. In addition, referring to Figure 3, the control surface 43 assures, for optimum strut resistance to disengagement of pawl element 26, that the centers of the cross shaft 34 and the pins 38 and 40 are in substantial alignment, i.e., these centers when connected establish either a straight or approximately a straight line which is tangent to the arc defined by swinging movement of the center of pin 40. With three of the important control points, namely, the center of cross shaft 34, the pin 38 and the control surface 43 on the control lever, it can be seen that positive insurance that the center of the pin 38 never moves above or overcenter relative to the straight line established by the centers of the shaft 34 and the pins 38 and 40 is now possible without compromise as to allowable extremes. Dimensional tolerances can be chosen which, with maximum and minimum extremes, would either locate the center of the pin 38 along this line established by the centers of the shaft 34 and pins 38 and 40 or slightly below (below center) this line. If these important control points were scattered throughout the linkage, then it will be appreciated a lengthy and involved geometrical solution is required to establish these extremes which could vary considerably more than with the present invention.

Also, rotatably mounted on the cross shaft 34 and separated from the lever 32 by spacer 45 is a U-shaped transfer lever 46 comprising an arm 48 partially enveloped by a lateral extension 49 on the control lever 32 (see Figure 4) and an opposite arm 50 to which a drive pin 52 is attached. A torsion spring 54 is positioned on the shaft 34 between the arms 48 and 50 of the transfer lever 46 and includes a leg 56 in engagement with the transfer lever 46 and an opposite leg 58 in engagement with the lateral extension 49 on the control lever 32. The effect of the spring 54 is to constantly exert a bias which engages drive surfaces 60 and 62 on the lateral extension 49 of the control lever 32 and the arm 48 of the transfer lever 46, respectively. When the pawl element 26 is engaged, a slight gap depicted in Figure 3 occurs between the drive surfaces 60 and 62 creating a load on the spring 54 sufficient to insure a full engagement of the coacting teeth 31 and 24.

As viewed in Figure 5 a sector plate, shown generally at 64, is secured to one end of a shaft 66 while the opposite end of the shaft extends to the exterior of the transmission casing 30 and is attached to an external shift lever 68 (see Figure 1). The lever 68 is then, as mentioned before, connected to the transmission selector lever 18 by an appropriate linkage 16. Along one edge of the sector plate 64, a series of notches 70 are furnished which correspond to the various transmission settings of the selector lever 18, e.g., Neutral, Park, Reverse and Forward Drive. In Figure 5 the sector plate 64 is shown releasably maintained in the Park or Brake position by the engagement of a spring biased detent plunger 72 with one of the notches 70 representing the Park position. The force exerted by the detent plunger 72 is intended to be only sufficient to maintain the transmission selector lever 18 in the chosen setting so that the operator senses each position as the lever 18 is rotated. This force is easily overcome when the selector lever 18 is repositioned.

On the opposite side of the sector plate 64 from the notches 70, a drive slot 74 is provided for accommodating the drive pin 52 when the sector plate 64 is in the Park position. As shown by Figure 3, the drive slot 74 is defined by a rearwardly extending projection 76, the under surface 78 of which engages the drive pin 52 when the sector plate 64 is rotated clockwise, as viewed in Figure 5. When the sector plate 64 is rotated counterclockwise from the Park position, an upwardly facing surface 79 at the bottom of the drive slot 74 will engage the drive pin 52 and rotate it and the transfer lever 46 clockwise, as illustrated in Figure 3, until the pin 52 is removed from the slot 74 whereupon the pin will engage the surface afforded along a flange 80 on the sector plate 64. The flange 80 prevents (see Figure 2) counterclockwise rotation of the drive pin 52 and the transfer lever 46 which motion corresponds to the engaging movement of the pawl element 26.

To summarize the operation, assume that the transmission selector lever 18 is moved to the Park position. As a result, the sector plate 64 through the linkage 16, external shift lever 68 and shaft 66 will be rotated to the Figure 5 position. This rotation effects a pick up of the drive pin 52 by the under surface 78 of the projection 76 and moves the pin into the drive slot 74 on the plate 64. Hence, the U-shaped transfer lever 46 will be rotated therewith and through the torsion spring 54 revolve the control lever 32 and the pawl element 26 through links 36 to the Figure 3 position. If the pawl element tooth 31 and the teeth 24 on the locking gear 22 are not properly aligned, e.g., the tooth 31 engages the top of one of the teeth 24, then the resilient connection afforded by the spring 54 will allow the transmission selector lever 18 as well as the sector plate 64 and transfer lever 46 to be rotated to the pawl element engaged position. However, since the pawl element 26 is held out of engagement, the drive surfaces 60 and 62 on the arm 48 of the transfer lever 46 and the extension 50 on the control lever 32 will be separated a predetermined distance until the locking gear 22 is rotated slightly to permit engagement of the tooth 31 with the locking gear teeth 24, whereupon the spring bias built up will quickly effect the engagement. As previously described with an optimum condition, the centers of the shaft 34 and the pins 38 and 40 will be along a straight line providing strut action which resists disengagement of the pawl element 26. Due to manufacturing tolerances, the center of the pin 38 may be slightly below this straight line with the control surface 43 still in engagement with the side of the pin 40. Preferably, provision is made to insure that the center of the pin 38 does not go above the straight line which condition would cause difficulty in disengaging the pawl element 26.

When the transmission selector lever 18 is moved to a setting other than the Park position, the surface 79 along the bottom edge of drive slot 74 of the sector plate 64 will rotate the drive pin 52 and accordingly, the transfer lever 46 clockwise, as viewed in Figure 2, whereupon the drive surface 60 along the transfer lever arm 48 will engage the drive surface 62 on the control lever extension 50. A positive pull out then is provided so that further rotation of the transfer lever 46 will rotate the control lever 32 and through links 46 pull the pawl element 26 out of engagement with the locking gear 22 (Figure 2). As aforementioned, the extent of movement of the control lever 32 to the Figure 2 position is determined by the abutment surface 44 which engages the pin 40.

From the foregoing it can be seen that a parking brake mechanism constructed according to the invention will be easily disengageable at all times and furthermore, the arrangement of the important control points within one component is desirable since the production tolerances can be relaxed on all the other elements of the mechanism reducing considerably the cost of individual mechanisms.

The invention is to be limited only by the following claims.

I claim:

1. In a brake mechanism, the combination of a rotatable member, a locking member connected to the rotatable member, a locking element movable to and from an engaged position relative to the locking member so as to prevent rotation of the rotatable member, manual control means movable to and from a brake position, and linkage operative upon movement of the manual control means to the brake position for moving the locking element to the engaged position, the linkage comprising a control element rotatable about a first pivotal connection thereon, a link pivotally connected to the locking element and connected to the control element by a second pivotal connection thereon, and a pin carried by the pivotal connection between the link and the locking element, a control surface formed along a portion of said control element, the control element having the control surface thereon accurately positioned closely adjacent a reference line interconnecting the pivotal axes of said first and second pivotal connections on said control element and being further positioned in the path of said pin so that when the locking element is in the engaged position the control surface engages the pin, the disposition of the control surface being such that when the control surface is in engagement with the pin the pivotal axes of the pivotal connections of said control element and said link are in substantial alignment so as to resist disengagement of the locking element and such that the overcenter movement of the linkage is limited.

2. In a brake mechanism, the combination of a rotatable member, a locking member connected to the rotatable member, a locking element movable to and from an engaged position relative to the locking member so as to prevent rotation of the rotatable member, manual control means movable to and from a brake position, linkage operative upon movement of the manual control means to the brake position for moving the locking element to the engaged position, the linkage comprising a control element rotatable about a first pivotal connection, a link pivotally connected to the locking element by a pin and connected to the control element by a second pivotal connection thereon, a control surface formed along a portion of said control element, the control element having the control surface thereon accurately positioned closely adjacent a reference line interconnecting the pivotal axes of said first and second pivotal connections on said control element and being further positioned in the path of said pin so that when the locking element is in the engaged position the control surface engages the pin, the disposition of the control surface being such that when the control surface is in engagement with the pin the pivotal axes of the pivotal connections on said control element and said link are in substantial alignment so as to resist disengagement of the locking element and such that the overcenter movement of the linkage is limited, and means connecting the manual control means and the control element including a resilient connection for moving the locking element to the engaged position and a positive connection for moving the locking element to the disengaged position.

3. In a brake mechanism, the combination of a rotatable member, a toothed locking member connected to the rotatable member, a toothed locking element movable to and from an engaged position relative to the locking member so as to prevent rotation of the rotatable member, the toothed locking member and the toothed locking element having tooth side angles so disposed that the locking member and the locking element tend to disengage under load, manual control means movable to and from a brake position, and linkage operative upon movement of the manual control means to the brake position for moving the locking element to the engaged position, the linkage comprising a control element rotatable about a first pivotal connection thereon and connected to the manual control means, a link pivotally connected to the locking element and connected to the control element by a second pivotal connection thereon, and a pin carried by the pivotal connection between the link and the locking element, a control surface formed along a portion of said control element the control surface being accurately positioned closely adjacent a reference line interconnecting the pivotal axes of said first and second pivotal connections on said control element and being further positioned in the path of said pin so that when the locking element is in the engaged position the control surface engages the pin, the disposition of the control surface being such that when the control surface is in engagement with the pin the pivotal axes of the pivotal connections on said control element and said link are in substantial alignment so as to resist disengagement of the locking element and such that the overcenter movement of the linkage is limited, and means connecting the manual control means and the control element including a resilient connection for moving the locking element to the engaged position and a positive connection for moving the locking element to the disengaged position.

4. In a brake mechanism, the combination of a rotatable member, a toothed locking member connected to the rotatable member, a toothed locking element movable to and from an engaged position relative to the toothed locking member so as to prevent rotation of the rotatable member, the toothed locking member and the toothed locking element having tooth side angles so disposed that the locking member and the locking element tend to disengage under load, manual control means movable to and from a brake position, and linkage operative upon movement of the manual control means to the brake position for moving the locking element to the engaged position, the linkage comprising a first lever rotatable by the manual control means, a second lever rotatable about a first pivotal connection coaxial with the first lever and having control and abutment surfaces thereon, a spring interposed between the levers, a link pivotally connected to the locking element and connected to the second lever by a second pivotal connection thereon, and a pin carried by the pivotal connection between the link and the locking element, the second lever element having the control surface thereon accurately positioned closely adjacent a reference line interconnecting the pivotal axes of said first and second pivotal connections on said second lever element and being further positioned in the path of said pin so that when the locking element is in the engaged position the control surface engages the pin, the disposition of the control surface being such that when the control surface is in engagement with the pin the pivotal axes of the pivotal connections on said second lever element and said link are in substantial alignment so as to resist disengagement of the locking element and such that the overcenter movement of the linkage is limited, the abutment surface being arranged to engage the pin so as to limit the extent of disengagement movement of the linkage, movement of the manual control means to the brake position causing the first lever to be rotated and the second lever to be moved by the spring so as to yieldably move the locking element to the engaged position, each of the levers having drive surfaces thereon engageable upon movement of the manual control means from the brake position to afford a positive pull out of the locking element from the engaged position.

5. In a brake mechanism, the combination of a rotatable member, a toothed locking member connected to the rotatable member, a toothed locking element movable to and from an engaged position relative to the locking member so as to prevent rotation of the rotatable member, the locking member and the locking element having tooth side angles so disposed that the locking member and the locking element tend to disengage under load, manual control means movable to and from a brake position, and linkage operative upon movement of the manual control means to the brake position for moving the locking element to the engaged position, the linkage comprising a rotatable control element rotatable about a first pivotal connection and having drive and control surfaces thereon, a rotatable transfer element coaxial with the control element and rotatable by the manual control means, the transfer element including a drive surface adjacent the drive surface on the control element, a torsion spring interposed between the control and transfer elements for urging the drive surfaces into engagement, a link, and a first pin pivotally connecting the link to the locking element, a second pin forming a second pivotal connection on the control element and pivotally connecting the link thereto, the control element having the control surface thereon accurately positioned closely adjacent a reference line interconnecting the pivotal axes of said first and second pivotal connections on said control element and being further positioned in the path of said first pin, so that when the locking element is in the engaged position the control surface engages the first pin, the disposition of the control surface being such that when the control surface is in engagement with the first pin the pivotal axes of said first and second pivotal connections and said first pin are in substantial alignment so as to resist disengagement of the locking element and such that the overcenter movement of the linkage is limited, movement of the manual control means to the brake position causing the transfer element to be rotated and the control element to be rotated by the spring and provide a yieldable connection for moving the locking element to the engaged position and movement from the brake position of the manual control means causing the drive surfaces on the transfer and control element to engage and afford a positive connection for moving the locking element from the engaged position.

6. In a parking brake for a transmission the combination of a transmission shaft, a toothed locking gear connected to the transmission shaft, a toothed pawl element movable to and from an engaged position relative to the locking gear so as to prevent rotation of the transmission shaft, the locking gear and pawl element having tooth side angles so disposed that the locking gear and the locking element tend to disengage under load, a transmission selector lever positionable in a plurality of transmission settings including a Park position, linkage operative upon movement of the selector lever to the Park position for moving the pawl element to the engaged position, the linkage comprising a control element rotatable about a first pivotal connection and having a control surface formed along a portion thereof, a link pivotally connected to the pawl element and connected to the control element by a second pivotal connection thereon, and a pin carried by the pivotal connection between the link and the pawl element, the control element having the control surface thereon accurately positioned closely adjacent a reference line interconnecting the axes of rotation of said first and second pivotal connections on said control element and being further positioned in the path of said pin so that when the locking element is in the engaged position the control surface engages the pin, the disposition of the control surface being such that when the control surface is in engagement with the pin the pivotal axes of the pivotal connections on said control element and said link are in substantial alignment so as to resist disengagement of the locking element and such that the overcenter movement of the linkage is limited, and means connecting the transmission selector lever and the control element including a resilient connection for moving the pawl element to the engaged position and a positive connection for removing the pawl element from the engaged position.

7. In a parking brake for a transmission, the combination of a transmission shaft, a toothed locking gear connected to the transmission shaft, a toothed pawl element movable to and from an engaged position relative to the locking gear so as to prevent rotation of the transmission shaft, the toothed locking gear and the toothed pawl element having tooth side angles so disposed that the locking gear and the pawl element tend to disengage under load, a transmission selector lever positionable in a plurality of transmission settings including a Park position, and linkage operative upon movement of the transmission selector lever to the Park position for moving the pawl element to the engaged position, the linkage comprising a control element rotatable about a first pivotal connection and having drive and control surfaces thereon, a rotatable transfer element coaxial with the control element and including a drive surface adjacent the drive surface on the control element, a torsion spring urging the drive surfaces into engagement, a sector plate positionable by the transmission selector lever and connectible with the transfer element upon movement of the selector lever to the Park position for moving the linkage and the pawl element to the engaged position, a link pivotally connected to the pawl element and connected to the control element by a second pivotal connection thereon, and a pin carried by the pivotal connections between the link and the pawl element, the control element having the control surface thereon accurately positioned closely adjacent a reference line interconnecting the axes of rotation of said first and second pivotal connections on said control element and being further positioned in the path of said pin so that when the locking element is in the engaged position the control surface engages the pin, the disposition of the control surface being such that when the control surface is in engagement with the pin the pivotal axes of the pivotal connections on said control element and said link are in substantial alignment so as to resist disengagement of the locking element and such that the overcenter movement of the linkage is limited, movement of the transmission selector lever to the Park position causing the transfer element to be rotated and the control element to be rotated by the spring thereby providing a yieldable connection for moving the pawl element to the engaged position and movement of the selector lever from the Park position causing the drive surfaces on the transfer and control element to engage and afford a positive connection to move the pawl element from the engaged position.

8. In a parking brake for a transmission, the combination of a transmission shaft, a toothed locking gear connected to the transmission shaft, a toothed pawl element movable to and from an engaged position relative to the locking gear so as to prevent rotation of the transmission shaft, the toothed locking gear and the toothed pawl element having tooth side angles so disposed that the locking gear and the pawl element tend to disengage under load, a transmission selector lever positionable in a plurality of transmission settings including a Park position, and linkage operative upon movement of the transmission selector lever to the Park position for moving the pawl element to the engaged position, the linkage comprising a control element rotatable about a first pivotal connection and having drive and control surfaces thereon, a rotatable transfer element coaxial with the control element and including a drive surface adjacent the drive surface on the control element, a torsion spring urging the drive surfaces into engagement, a sector plate positionable by the transmission selector lever and connectible with the transfer element upon movement of the selector lever to the Park position for moving the linkage and the pawl element to the Park position, a link pivotally connected to the pawl element and connected to the control element by a second pivotal connection thereon, a pin carried by the pivotal connections between the link and the pawl element, the control element having the control surface thereon accurately positioned closely adjacent a reference line interconnecting the axes of rotation of said first and second pivotal connections on said control element and being further positioned in the path of said pin so that when the locking element is in the engaged position the control surface engages the pin, the disposition of the control surface being such that when the control surface is in engagement with the pin the pivotal axes of the pivotal connections on said control element and said link are in substantial alignment so as to resist disengagement of the locking element and such that the overcenter movement of the linkage is limited, movement of the transmission selector lever to the Park position causing the transfer element to be rotated and the control element to be rotated by the spring thereby providing a yieldable connection for moving the pawl element to the engaged position and movement of the selector lever from the Park position causing the drive surfaces on the transfer and control element to engage and afford a positive connection to move the pawl element from the engaged position, and an abutment on the control element engageable with the pin to limit the movement of the pawl element from the disengaged position.

References Cited in the file of this patent
UNITED STATES PATENTS

| | | |
|---|---|---|
| 2,653,689 | Hasbany | Sept. 29, 1953 |
| 2,670,064 | Hasbany | Feb. 23, 1954 |
| 2,689,029 | McFarland | Sept. 14, 1954 |
| 2,709,504 | Mamo | May 31, 1955 |
| 2,770,326 | Wayman | Nov. 13, 1956 |
| 2,860,731 | Hause | Nov. 18, 1958 |